US009021551B2

(12) United States Patent
Hori et al.

(10) Patent No.: US 9,021,551 B2
(45) Date of Patent: Apr. 28, 2015

(54) INFORMATION PROCESSING APPARATUS, AUTHENTICATION CONTROL METHOD, AND AUTHENTICATION CONTROL PROGRAM

(75) Inventors: Seijiro Hori, Tokyo (JP); Yuuki Ohtaka, Kanagawa (JP); Satoru Kawakubo, Chiba (JP)

(73) Assignee: Ricoh Company, Ltd., Tokyo (JP)

( * ) Notice: Subject to any disclaimer, the term of this patent is extended or adjusted under 35 U.S.C. 154(b) by 1156 days.

(21) Appl. No.: 12/175,723

(22) Filed: Jul. 18, 2008

(65) Prior Publication Data

US 2009/0070855 A1  Mar. 12, 2009

(30) Foreign Application Priority Data

Sep. 11, 2007  (JP) ................................. 2007-235768

(51) Int. Cl.
*G06F 21/31* (2013.01)
(52) U.S. Cl.
CPC ...................................... *G06F 21/31* (2013.01)
(58) Field of Classification Search
CPC ....................................................... G06F 21/31
USPC .......................................................... 726/2–5
See application file for complete search history.

(56) References Cited

U.S. PATENT DOCUMENTS

| | | | |
|---|---|---|---|
| 6,924,727 B2* | 8/2005 | Nagaoka et al. ............... 340/3.1 |
| 7,201,659 B2* | 4/2007 | Nakayama et al. ............. 463/42 |
| 7,707,414 B2* | 4/2010 | Nishio .......................... 713/168 |
| 7,954,150 B2* | 5/2011 | Croft et al. ...................... 726/21 |
| 2002/0124093 A1* | 9/2002 | Nakai ............................ 709/229 |
| 2003/0093690 A1* | 5/2003 | Kemper ........................ 713/201 |
| 2003/0154413 A1* | 8/2003 | Shigeeda ....................... 713/202 |
| 2005/0084244 A1* | 4/2005 | Murabayashi ................... 386/95 |
| 2007/0101153 A1* | 5/2007 | Kawaji .......................... 713/185 |
| 2007/0234421 A1* | 10/2007 | Ogino et al. ..................... 726/19 |
| 2009/0070868 A1* | 3/2009 | Ohtaka et al. ................... 726/21 |
| 2009/0300757 A1* | 12/2009 | Tanaka et al. ................... 726/20 |

FOREIGN PATENT DOCUMENTS

| | | |
|---|---|---|
| JP | 2000-122975 A | 4/2000 |
| JP | 2001-154899 A | 6/2001 |
| JP | 2003-285513 A | 10/2003 |

(Continued)

OTHER PUBLICATIONS

U.S. Appl. No. 12/205,297, filed Sep. 5, 2008, Ohtaka, et al.

(Continued)

*Primary Examiner* — Beemnet Dada
(74) *Attorney, Agent, or Firm* — Oblon, McClelland, Maier & Neustadt, L.L.P.

(57) ABSTRACT

An information processing apparatus includes a user information managing part that manages registered user information, an authentication part that performs user authentication using the registered user information managed by the user information managing part, an external authentication part that controls an external computer to perform authentication on user information input via an input interface and acquires authenticated user information from the computer when the input user information is successfully authenticated by the computer, and a registration part that registers the authenticated user information acquired by the external authentication part in the user information managing part as the registered user information.

7 Claims, 12 Drawing Sheets

(56) References Cited

FOREIGN PATENT DOCUMENTS

| JP | 2004-355223 | 12/2004 |
|----|-------------|---------|
| JP | 2004-362402 | 12/2004 |
| JP | 2006-92437 | 4/2006 |
| JP | 2006-215770 | 8/2006 |
| JP | 2007-43365 | 2/2007 |
| JP | 2007-122384 | 5/2007 |
| JP | 2007-179509 | 7/2007 |
| WO | WO 2007/060034 A1 | 5/2007 |

OTHER PUBLICATIONS

Office Action issued May 29, 2012 in Japanese Application No. 2007-235768.
Office Action issued Sep. 17, 2013, in Japanese Patent Application No. 2012-200686.

* cited by examiner

FIG.4

| LOGIC IMPLEMENTATION MODULE | REGISTRATION INFORMATION |
|---|---|
| EXTERNAL DEVICE CONTROL IMPLEMENTATION MODULE | ⋮ |
| EXTERNAL DEVICE INFORMATION ACQUISITION IMPLEMENTATION MODULE | ⋮ |
| EXTERNAL AUTHENTICATION PROCESS IMPLEMENTATION MODULE | ⋮ |
| MAINFRAME AUTHENTICATION CONTROL IMPLEMENTATION MODULE | ⋮ |

INFORMATION PROCESSING APPARATUS, AUTHENTICATION CONTROL METHOD, AND AUTHENTICATION CONTROL PROGRAM

BACKGROUND OF THE INVENTION

1. Field of the Invention

The present invention relates to an information processing apparatus, an authentication control method, and an authentication control program.

2. Description of the Related Art

It is presently taken for granted that corporations take measures to meet certain information security standards. There is also a growing demand for ensuring security with regard to OA equipment usage. In view of such circumstances, image forming apparatuses with copier, printer, scanner, and/or fax functions that have user authentication systems built therein have been developed.

It is noted that user information (e.g., user name and password) to be input via an input interface upon performing user authentication is preferably input in a manner such that a person other than the user may not be able to easily recognize the user information. In this regard, Japanese Laid-Open Patent Publication No. 2006-215770, Japanese Laid-Open Patent Publication No. 2007-122384, and Japanese Laid-Open Patent Publication No. 2006-92437 disclose techniques that involve having the user input user information using an external device (e.g., an IC card) rather than having the user input the user information manually via a user interface such as an operations panel.

Also, it is noted that in many cases, an authentication system using an authentication server may already be implemented within a user environment using an image forming apparatus.

However, according to the techniques disclosed in the above documents, processes performed at the IC card and the external authentication server and processes performed at the image forming apparatus are fixed. Also, external devices that may be used for user authentication are fixed and limited. In other words, the authentication function (authentication system) of the image forming apparatus is independent from the existing authentication system implemented in the user environment so that system redundancy may occur and maintenance operations may be complicated.

SUMMARY OF THE INVENTION

Aspects of the present invention are directed to providing an information processing apparatus, an authentication control method, and an authentication control program for enabling efficient authentication operations.

According to one embodiment of the present invention, an information processing apparatus is provided that includes:

a user information managing part that manages registered user information;

an authentication part that performs user authentication using the registered user information managed by the user information managing part;

an external authentication part that controls an external computer to perform authentication on user information input via an input interface and acquires authenticated user information from the computer when the input user information is successfully authenticated by the computer; and a registration part that registers the authenticated user information acquired by the external authentication part in the user information managing part as the registered user information.

According to another embodiment of the present invention, an authentication control method is provided that is used by an information processing apparatus including a user information managing part that manages registered user information and an authentication part that performs user authentication using the registered user information managed by the user information managing part, the method including the steps of:

controlling an external computer to perform authentication on user information input via an input interface;

acquiring authenticated user information from the computer when the input user information is successfully authenticated by the computer; and registering the authenticated user information acquired from the computer in the user information managing part as the registered user information.

According to another embodiment of the present invention, an authentication control program that is tangibly embodied on a computer-readable medium is provided which program, when executed by a computer processor, performs an authentication control program according to an embodiment of the present invention.

It is noted that other objects, features and advantages of the present invention will become more apparent from the following detailed description when read in conjunction with the accompanying drawings.

BRIEF DESCRIPTION OF THE DRAWINGS

FIG. 4 is a table illustrating exemplary registration information of the logic implementation modules;

DETAILED DESCRIPTION OF THE PREFERRED EMBODIMENTS

In the following, preferred embodiments of the present invention are described with reference to the accompanying drawings.

It is noted that in the following descriptions, an image forming apparatus is illustrated as an exemplary embodiment of an information processing apparatus according to the present invention.

Figure 1:
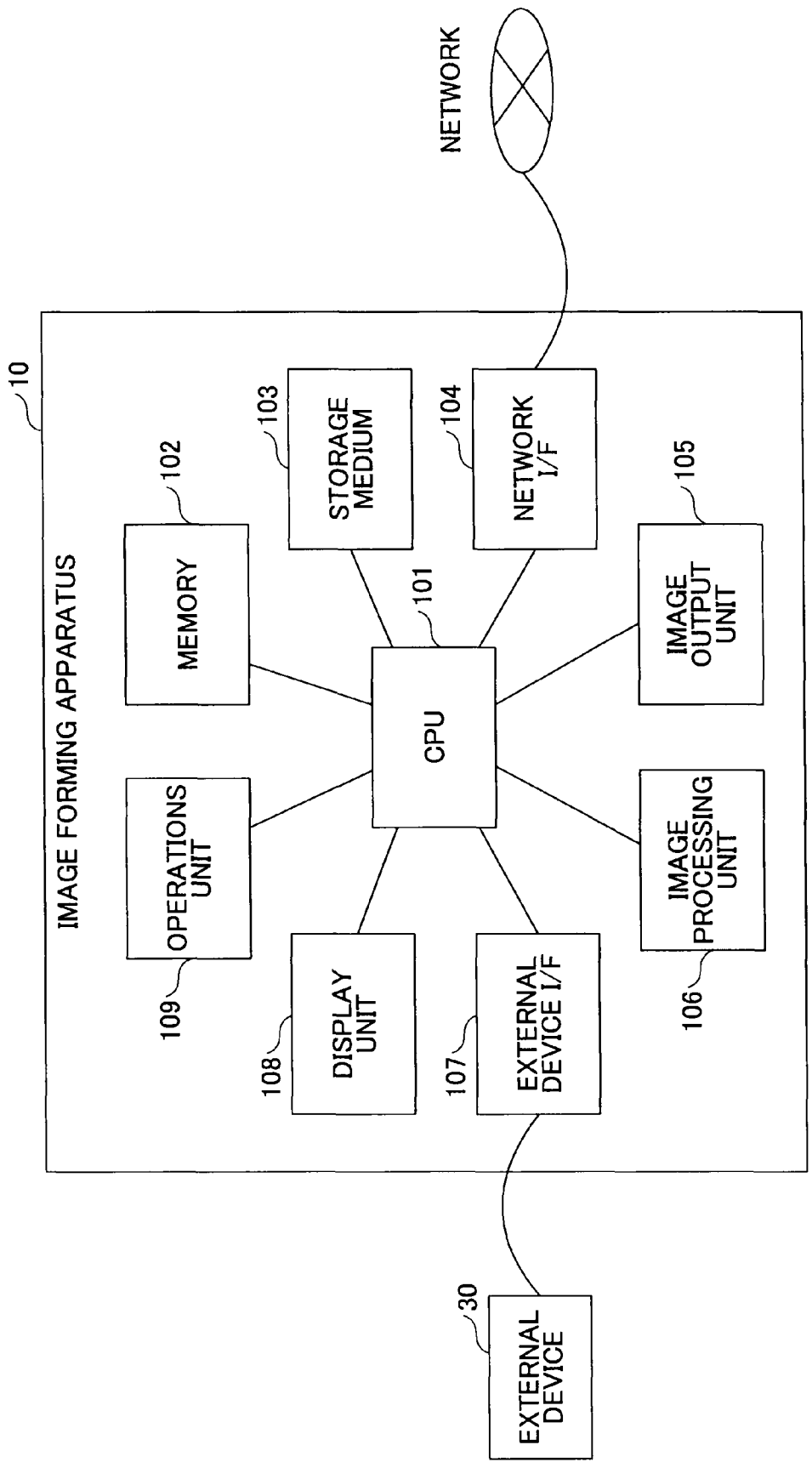
FIG. 1 is a diagram showing a hardware configuration of an image forming apparatus according to an embodiment of the present invention.

FIG. 1 is a diagram showing a hardware configuration of an image forming apparatus according to an embodiment of the present invention. The illustrated image forming apparatus 10 of FIG. 1 may be a printer, a copier, or a multifunction machine, for example, and includes a CPU 101, a memory 102, a nonvolatile storage medium 103, a network interface (I/F) 104, an image output unit 105, an image processing unit 106, an external device interface (I/F) 107, a display unit 108, and an operations unit 109.

It is noted that programs for enabling execution of functions of the image forming apparatus 10 are installed in the nonvolatile storage medium 103, which may be a hard disk drive (HDD), for example. The storage medium 103 is configured to store programs installed therein as well as files and data necessary for executing the programs. The memory 102 is configured to read a relevant program from the storage medium 103 when a program activation command is issued and store the read program. The CPU 101 is configured to control overall operations of the image forming apparatus 10 in accordance with the program stored in the memory 102. The network I/F 104 is an interface for establishing connection with a network.

The display unit 108 may be a liquid crystal display (LCD) that is configured to display operation screens and messages, for example. The operations unit 109 may include buttons or keys for accepting operation inputs from a user. In one embodiment, the display unit 108 and the operations panel 109 may be integrated as a single operations panel.

The image processing unit 106 executes various image processing operations that are necessary for outputting (e.g., printing) image data. The image output unit 105 is configured to output (e.g., print) the image data.

The external device I/F 107 is an input interface that establishes connection with an external device 30 to which user information used for user authentication is input. The external device I/F 107 may be a USB port or a serial board, for example. The external device 30 for inputting user information may be an IC card reader that reads user information stored in an IC card, a USB memory, or a keyboard, for example.

Figure 2:
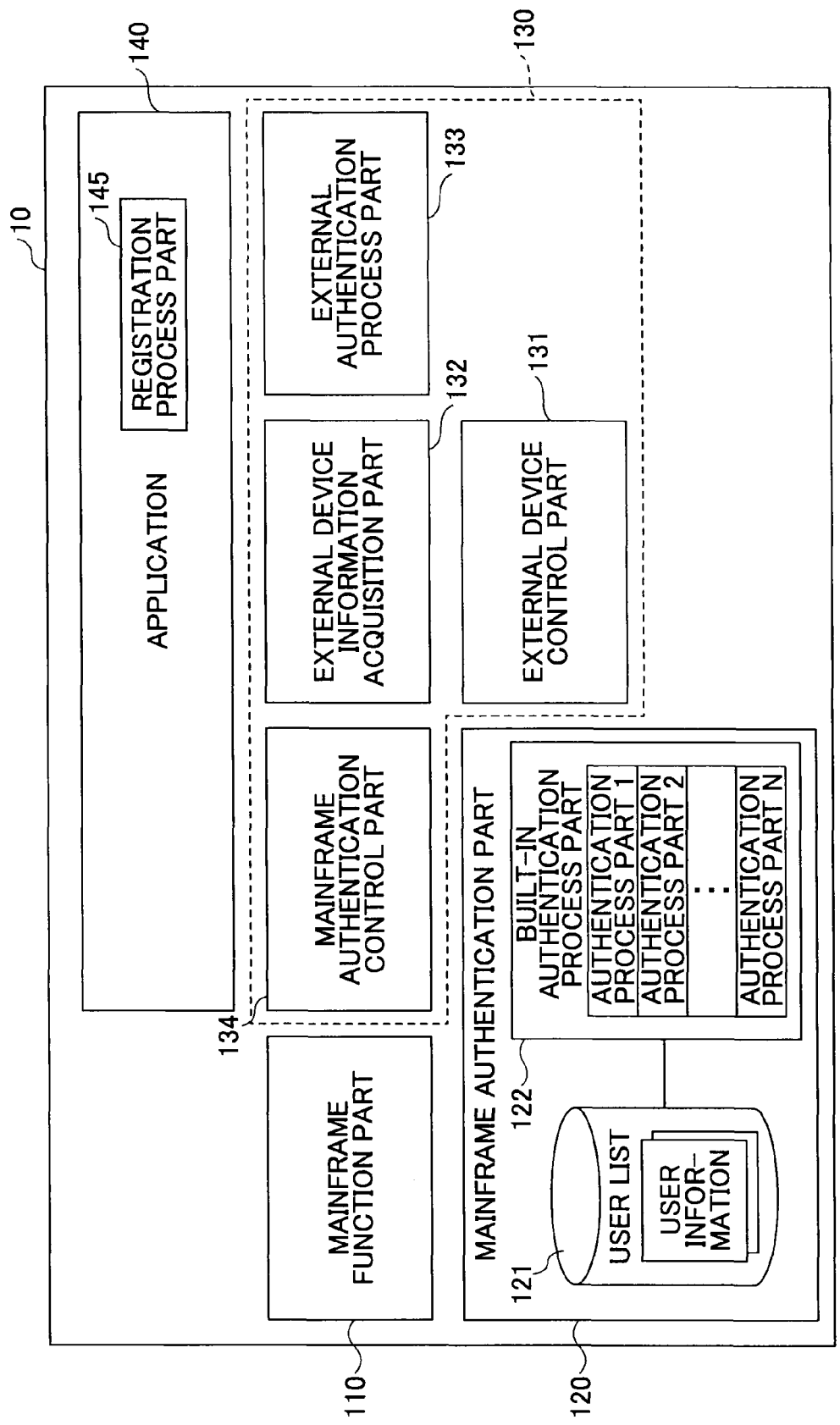
FIG. 2 is a diagram showing an exemplary functional configuration of the image forming apparatus according to the present embodiment.

FIG. 2 is a diagram showing an exemplary functional configuration of the image forming apparatus according to the present embodiment. In FIG. 2, the image forming apparatus 10 includes a mainframe function part 110, a mainframe authentication part 120, a framework 130, and an application 140, for example. In one embodiment, these component parts may correspond to software functions that are implemented by the CPU 101 executing processes according to relevant programs.

The mainframe authentication part 120 includes a user list 121 and a built-in authentication process part 122, for example, and is configured to execute built-in user authentication functions of the image forming apparatus 10. It is noted that built-in user authentication functions correspond to functions installed in the image forming apparatus 10 beforehand that are used for performing user authentication when a user attempts to use the application 140 operating on the image forming apparatus 10.

The built-in authentication process part 122 performs a user authentication process for executing a built-in user authentication function using user information managed in the user list 121. For example, the built-in authentication process part 122 may control the display unit 108 to display an authentication screen for prompting authentication. In turn, a user may input user information (e.g., user name and password) via the authentication screen, and the built-in authentication process part 122 may authorize use of the application 140 by the user only when the input user information is authenticated by the user information managed in the user list 121.

The user list 121 registers and manages user information and usage authorization information of each user. Thus, the built-in authentication processing unit 122 may compare the user information input by a user and user information registered in the user list 121 to perform user authentication. Also, when a user is authenticated, the built-in authentication processing unit 122 may limit authorized use of the image forming apparatus 10 to certain functions based on the usage authorization information registered in the user list 121.

In one embodiment, the image forming apparatus 10 may have the above-described authentication functions built-in beforehand as default functions.

The framework 130 provides an environment for executing the application 140. It is noted that the image processing apparatus 10 according to the present embodiment may have an application developed by a third vendor installed therein as the application 140. Accordingly, the framework 130 may include a class library (not shown) for operating such an application, for example.

In FIG. 2, exemplary functional parts of the framework 130 related to authentication are shown, including an external device control part 131, an external device information acquisition part 132, an external authentication process part 133, and a mainframe authentication control part 134. In the following descriptions, the framework related to authentication functions is referred to as 'authentication framework'. The authentication framework provides a scheme for securing flexibility and extensibility of authentication functions of the image forming apparatus 10. Also, in the following descriptions, an authentication function enabled by the authentication framework is referred to as 'extended authentication function' as opposed to the above-described 'built-in authentication function'.

The external device control part 131 is configured to control and establish communication with the external device 30 that is connected to the image forming apparatus 10 via a USB interface of a serial interface, for example. The external device information acquisition part 132 is configured to acquire user information from the external device 30 via the external device control part 131. The external authentication process part 133 is configured to establish communication with an external authentication service, such as an authentication server, via a network to control an authentication process using the authentication server, for example. In the following descriptions, authentication performed by the external authentication process part 133 using such an external authentication service is referred to as 'external authentication'. The mainframe authentication control part 134 is configured to control an authentication process executed within the image forming apparatus 10. In the following descriptions, authentication performed by the mainframe authentication control part 134 within the image forming apparatus 10 is referred to as 'mainframe authentication'.

The application 140 may be a standard application that is installed in the image forming apparatus 10 beforehand, such as a printing application, or an application developed by a third vendor in accordance with the environment provided by the framework 130, for example. In other words, although only one application 140 is illustrated in FIG. 2, plural applications 140 may be provided in the image forming apparatus 10 according to the present embodiment.

It is noted that in FIG. 2, the functional parts configuring the authentication framework only provide schemes (frameworks) for implementing a corresponding function. Specifically, in order to implement an actual process (logic) associated with a certain extended authentication function, a corresponding software module (referred to as 'logic implementation module' hereinafter) of the application 140 using the extended authentication function (referred to as 'application 140a' hereinafter) has to be registered by a registration process part 145.

Figure 3:
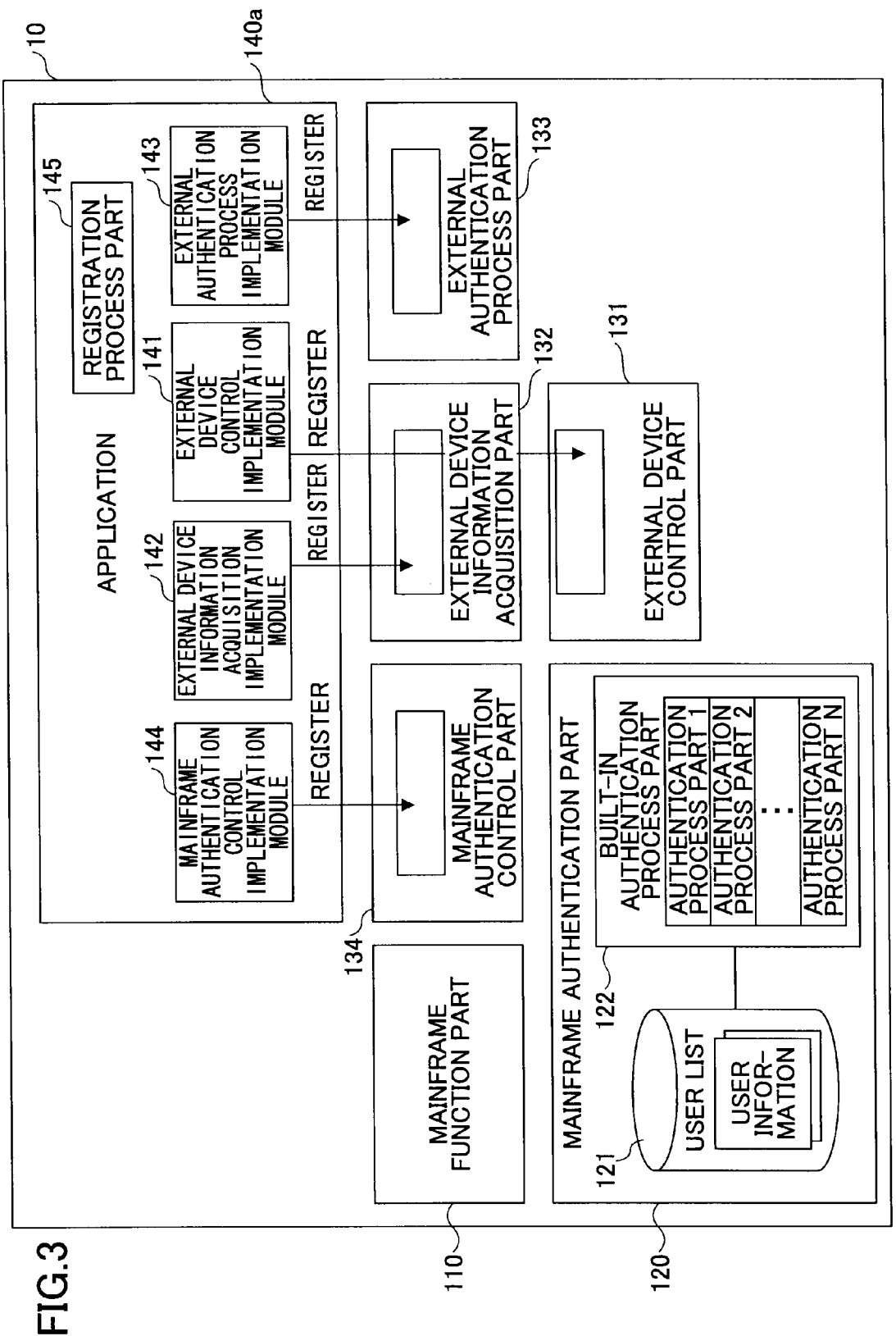
FIG. 3 is a diagram schematically illustrating registration of logic implementation modules in an authentication framework of the image forming apparatus according to the present embodiment.

FIG. 3 is a diagram schematically illustrating registration of logic implementation modules to the authentication framework. In FIG. 3, the application 140a includes an external device control implementation module 141, an external device information acquisition implementation module 142, an external authentication process implementation module 143, and a mainframe authentication control implementation module 144.

The external device control implementation module 141 is for implementing an interface-level communication process with the external device 30 and is registered in the external device control part 131. For example, the external device control implementation module 141 may be a driver program of a smart card reader that is configured to read information from a smart card of a user. According to the present embodiment, the image processing apparatus 10 may be flexibly adapted to use an arbitrary external device 30 according to the configuration of the external device control implementation module 141 being registered, for example.

The external device information acquisition implementation module 142 is for implementing an acquisition process of acquiring information (user information) from the external device 30 and is registered in the external device information acquisition part 132. For example, the external device information acquisition implementation module 142 may be a program configured to implement a process of transmitting a command according to the format of a smart card and receiving a response thereto to acquire user information stored in a smart card of a user. According to the present embodiment, the image processing apparatus 10 may be flexibly adapted to acquire user information from an arbitrary external device 30 according to the configuration of the external device information acquisition implementation module 142 being registered, for example.

The external authentication process implementation module 143 is for implementing a process related to authentication of user information using an external authentication computer (e.g., authentication server) and is registered in the external authentication process part 133. For example, the external authentication process implementation module 143 may be a program configured to implement a process of transmitting a serial number acquired from a smart card of a user to an LDAP (Lightweight Directory Access Protocol) authentication server and acquiring the corresponding user name of the user from the server. According to the present embodiment, the image processing apparatus 10 may be flexibly adapted to use an arbitrary authentication protocol according to the configuration of the external authentication process implementation module 143 being registered, for example.

The mainframe authentication control implementation module 144 is for implementing a mainframe authentication process and is registered in the mainframe authentication control part 134. For example, the mainframe authentication control implementation module 144 may be a program configured to implement an authentication screen switching process or an authentication information inputting process for performing authentication using the built-in authentication functions of the image forming apparatus 10. Specifically, the mainframe authentication control implementation module 144 may be implemented by the mainframe authentication control part 134 to control the display unit 108 to display a message screen indicating "Please set your smart card", to switch the message screen to indicate "authentication in process" when the smart card is being detected, and inputting user information acquired from the smart card during this process in the built-in authentication process part 122, for example. According to the present embodiment, the authentication screen to be displayed upon performing user authentication using the built-in authentication functions may be flexibly controlled according to the configuration of the mainframe authentication control implementation module 144 being registered, for example. In another embodiment, the mainframe authentication control implementation module 144 may be configured to enable the mainframe authentication control part 134 to implement authentication functions different from the built-in user authentication functions. For example, a process of configuring a user database (DB) different from the user list 121 within the storage medium 103 and performing authentication using such a user DB may be implemented by the mainframe authentication control implementation module 144.

In one embodiment, registration information of the logic implementation modules registered in the authentication framework may be stored and managed at the storage medium 103. FIG. 4 is a table illustrating exemplary registration information of the logic implementation modules. In the illustrated example of FIG. 4, registration information is registered in association with each logic implementation module. The registration information of each logic implementation module may include information for enabling the authentication framework to dynamically use (call) the corresponding logic implementation module, such as a file name of the file in which the actual logic implementation module is stored. The functional parts of the authentication framework may be configured to refer to this registration information in response to receiving a process request and determine the logic implementation module to be called. The logic implementation modules may be stored in a manner such that they may be dynamically called based on a corresponding interface (i.e., protocol for calling a corresponding logic implementation module) requested by the authentication framework (i.e., designated in the authentication framework). In one embodiment, logic implementation modules that are used may vary with respect to each application 140a. In such a case, registration information such as that illustrated in FIG. 4 may be associated with each application 140a and managed at the storage medium 103, for example.

By registering the logic implementation modules in the corresponding functional parts of the authentication framework in the above-described manner, means for inputting user information for user authentication may be diversified, for example.

In the following, operation process steps of the image forming apparatus 10 according to the present embodiment are described.

Specifically, process steps for performing user information acquisition, external authentication, and mainframe authentication using the authentication framework are described below with reference to FIGS. 5, 6, and 7.

Figure 5:
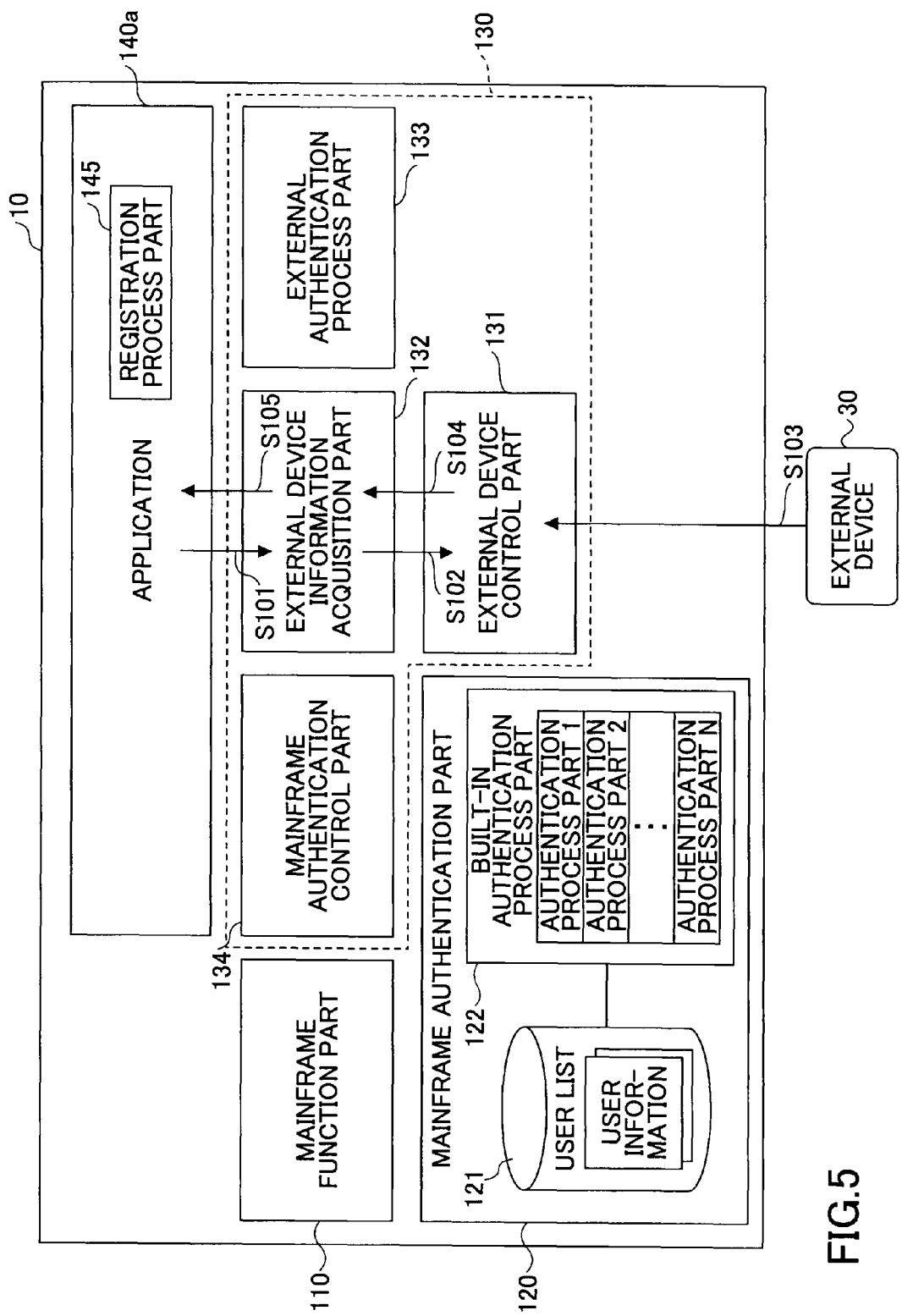
FIG. 5 is a diagram illustrating process steps for acquiring user information using the authentication framework.

FIG. 5 is a diagram illustrating process steps for acquiring user information using the authentication framework.

According to FIG. 5, first, the application 140a sends a user information acquisition request to the external device information acquisition part 132 (S101). The external device information acquisition part 132 establishes communication with the external device control part 131 using the record format level of the information managed by the external device 30 and issues a user information acquisition request to the external device control part 131 (S102). In turn, the external device control part 131 establishes interface-level communication with the external device 30 using the interface specification of the external device 30 and acquires user information from the external device 30 (S103). Then, the acquired user information is directed to the application 140a via the external device control part 131 and the external device information acquisition part 132 of the authentication framework in reverse order with respect to the user information calling order (S104, S105).

As can be appreciated from the above descriptions, the external device control part 131 and the external device information acquisition part 132 may be independently used by the application 140a. That is, the external device control part 131 and the external device information acquisition part 132 do not depend on other functional parts of the framework 130, such as the external authentication process part 133 or the mainframe authentication control part 134, and the acquired user information may be arbitrarily used by the application 140a.

Figure 6:
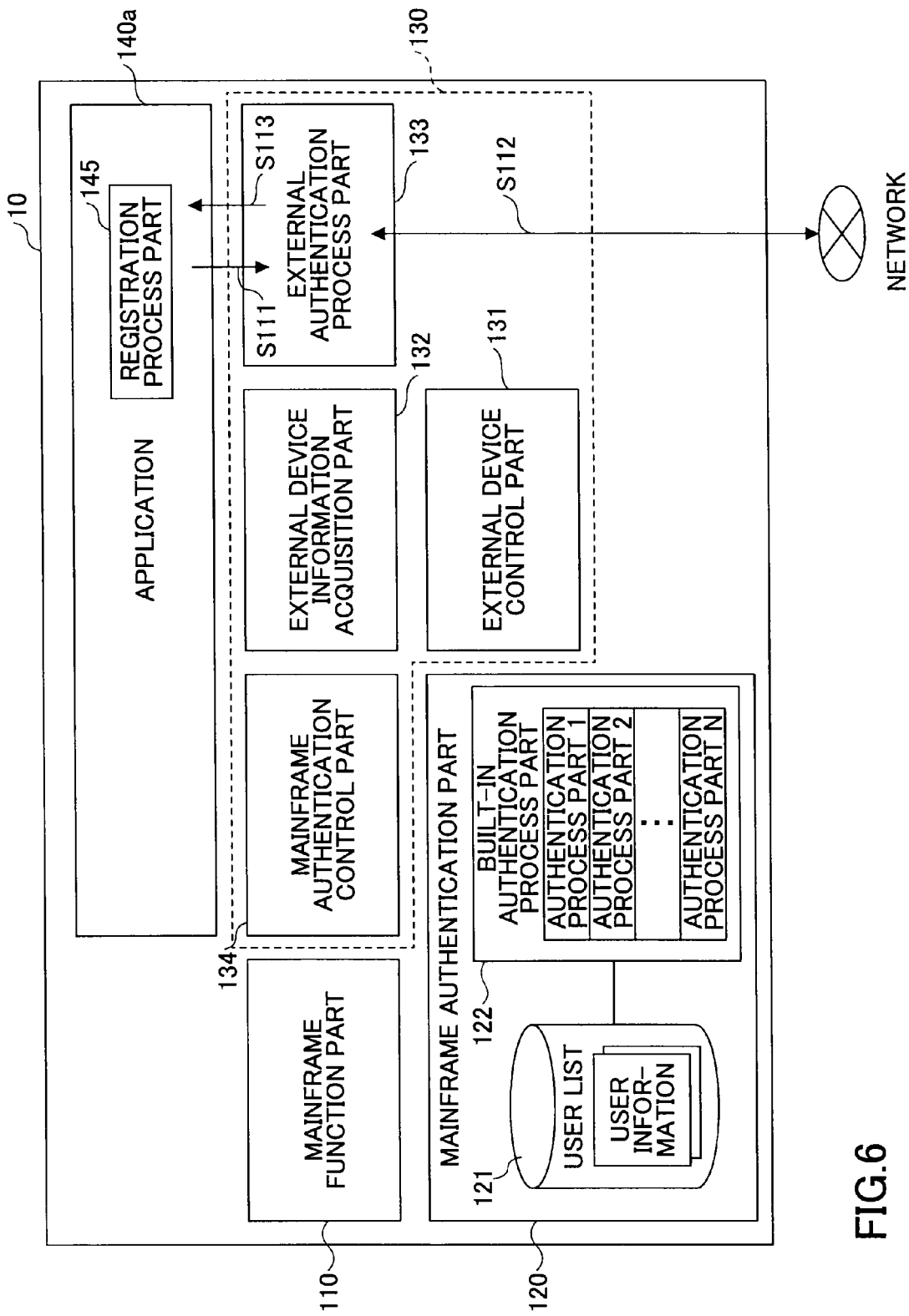
FIG. 6 is a diagram illustrating process steps for performing external authentication using the authentication framework.

FIG. 6 is a diagram illustrating process steps for performing external authentication using the authentication framework.

According to FIG. 6, first, the application 140a sends an authentication request to the external authentication process part 133 along with user information (S111). In turn, the external authentication process part 133 establishes communication with an external authentication service via a network to request the external authentication service to perform authentication based on the user information and receive the authentication result from the external authentication service (S112). Then, the external authentication process part 133 sends the authentication result to the application 140a (S113).

As can be appreciated from the above-descriptions, the external authentication process part 133 may be independently used by the application 140a upon performing external authentication.

Figure 7:
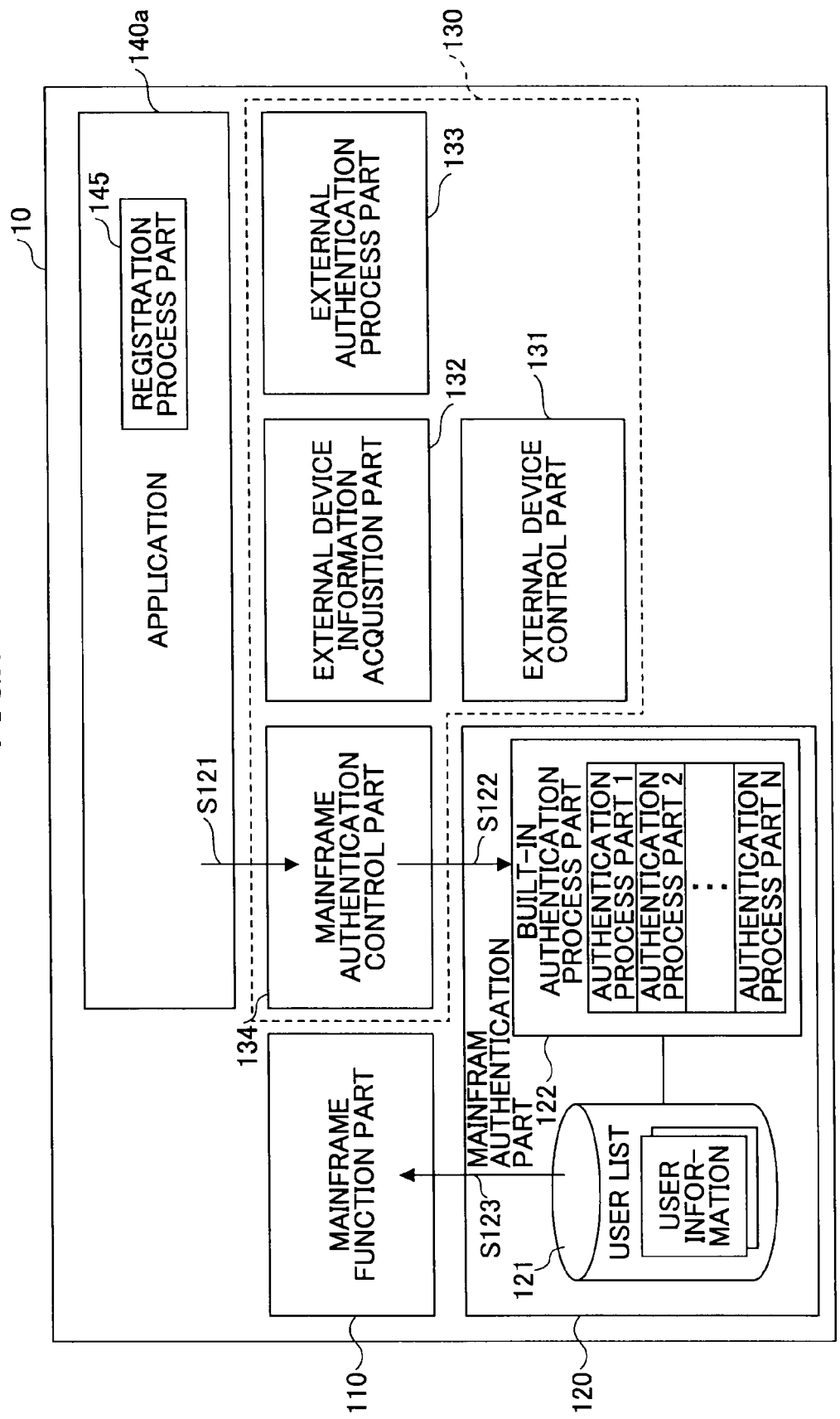
FIG. 7 is a diagram illustrating process steps for performing mainframe authentication using the authentication framework.

FIG. 7 is a diagram illustrating process steps for performing mainframe authentication using the authentication framework.

According to FIG. 7, first, the application 140a sends an authentication request to the mainframe authentication control part 134 along with user information (S121). In turn, the mainframe authentication part 134 inputs the user information to the built-in authentication process part 122 in response to which the built-in authentication process part 122 performs authentication based on the user information from the mainframe authentication part 134 and the user list 121 (S122). In this case, screen display switching may be controlled by the mainframe authentication part 134, for example. When the authentication is successful, the mainframe authentication part 120 unlocks the mainframe function part 110 (S123). As a result, the user (application 140a) may be able to use the functions of the image forming apparatus 10 according to the usage authorization information stored in the user list 121.

As can be appreciated from the above-descriptions, the mainframe authentication control part 134 may be independently used by the application 140a upon performing mainframe authentication.

Figure 8:
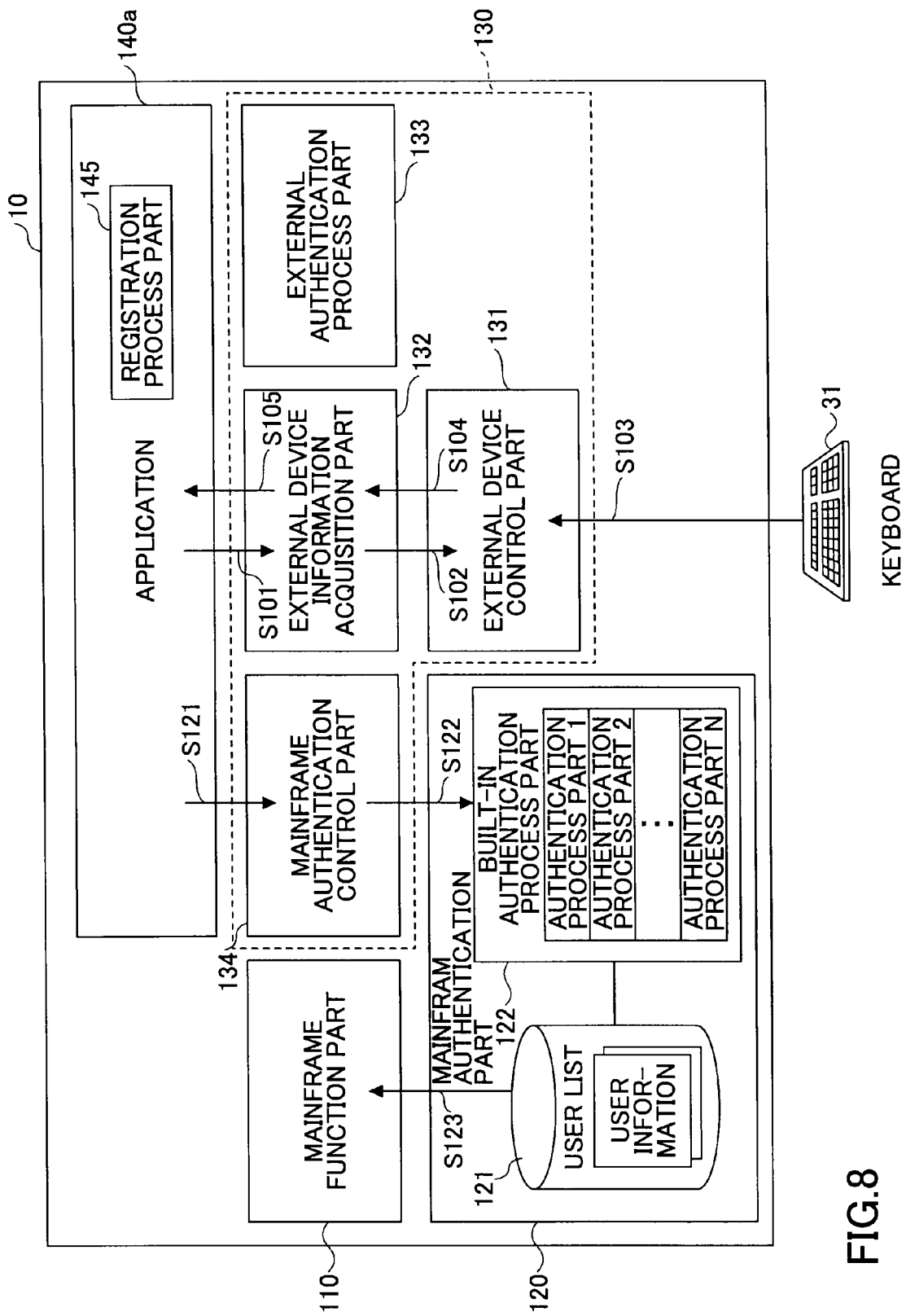
FIG. 8 is a diagram illustrating process steps of a first exemplary authentication process using the authentication framework.

In the following, process steps are described in relation to specific situations (solutions). FIG. 8 is a diagram illustrating process steps of a first exemplary authentication process using the authentication framework. It is noted that in FIG. 8, process steps that are identical to those described in relation to FIGS. 5 and 7 are given the same reference numbers.

In FIG. 8, a keyboard 31, as a specific embodiment of the external device 30, is connected to the image forming apparatus 10 via a USB interface. In this case, keyboard logic implementation modules are registered in the authentication framework as the external device control implementation module 141 and the external device information acquisition implementation module 142, and a logic implementation module for inputting user information to the mainframe authentication part 120 via a keyboard is registered in the authentication framework as the mainframe authentication control implementation module 144.

To perform an authentication process in FIG. 8, the application 140a acquires user information such as a user name and a password input via the keyboard 31 through the external device information acquisition part 132 and the external device control part 131 (S101-S105).

Then, the application 140a sends an authentication request to the mainframe authentication control part 134 along with the acquired user information in response to which the authentication part 120 performs authentication based on the user information (S121-S123).

It is noted that the specific example illustrated in FIG. 8 may be a solution for a low-spec image forming apparatus that does not include hardware such as a keyboard. In other embodiments, a USB memory or some other device from which user information may be adequately acquired may be used as the external device 30.

Figure 9:
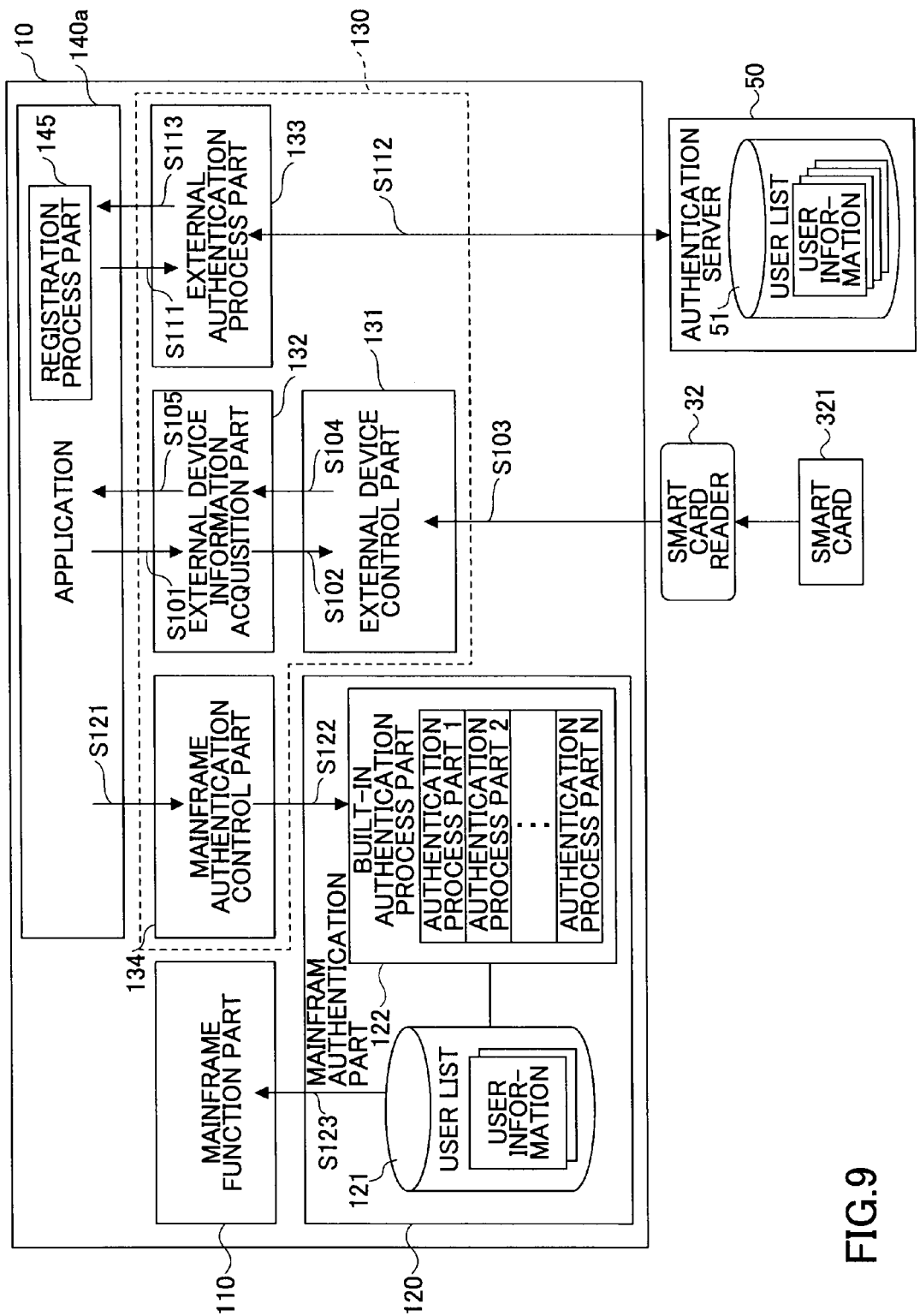
FIG. 9 is a diagram illustrating process steps of a second exemplary authentication process using the authentication framework.

FIG. 9 is a diagram illustrating process steps of a second exemplary authentication process using the authentication framework. It is noted that in FIG. 9, process steps that are identical to those described in relation to FIGS. 5, 6, and 7 are given the same reference numbers.

In FIG. 9, a smart card reader 32 as a specific embodiment of the external device 30 is connected to the image forming apparatus 10 via a USB interface. Also, an authentication server 50 is connected to the image forming apparatus 10 via a network. In this case, logic implementation modules for acquiring a card ID from a smart card 321 are registered in the authentication framework as the external device control implementation module 141 and the external device information acquisition implementation module 142, a logic implementation module for implementing a process of transmitting an authentication request along with the card ID to the authentication server 50 and acquiring user information corresponding to the card ID from the authentication server 50 is registered in the authentication framework as the external authentication process implementation module 143, and a logic implementation module for inputting to the mainframe authentication part 120 user information acquired as a result of the authentication performed by the authentication server 50 is registered in the authentication framework as the mainframe authentication control implementation module 144.

To perform an authentication process in FIG. 9, the application 140a acquires the card ID stored in the smart card 321 via the external device information acquisition part 132 and the external device control part 131 (S101-S105). Then, the application 140a transmits the acquired card ID to the authentication server 50 in response to which the authentication server 50 performs authentication based on the card ID and transmits user information (e.g., user name and password) corresponding to the card ID to the application 140a (S111-S113).

Then, the application 140a sends an authentication request to the mainframe authentication control part 134 along with the user information transmitted from the authentication server 50 in response to which the authentication part 120 performs authentication based on the user information (S121-S123).

In one modification of the example of FIG. 9, the mainframe authentication control implementation module 144 registered in the mainframe authentication control part 134 may be configured to enable display of a password input screen during implementation of a screen switching process so that when the password input screen is displayed, a user may be prompted to input his/her password using a keyboard as shown in FIG. 8, for example. In this way a solution with increased security may be provided.

As in the specific example of FIG. 9, when an authentication system using an authentication server 50 already exists within the user environment, and means for performing external authentication and mainframe authentication using the mainframe authentication part 120 is further desired, user information different from that stored in the authentication server 50 has to be registered in the user list 121 of the mainframe authentication part 120. In such a case, even if the formats of the user information managed by the authentication server 50 and the user information managed by the user list 121 are the same (e.g., both the authentication server 50 and the user list 121 manage user names and passwords as user information), user information of each authorized user has to be pre-registered in the user list 121 of each image forming apparatus 10 provided in the user environment which operations may be burdensome especially when a relatively large number of image forming apparatuses 10 are provided and a relatively large number of users are authorized to use the image forming apparatuses 10. In the following, exemplary measures for reducing the burden of such operations using the authentication framework are described.

Figure 10:
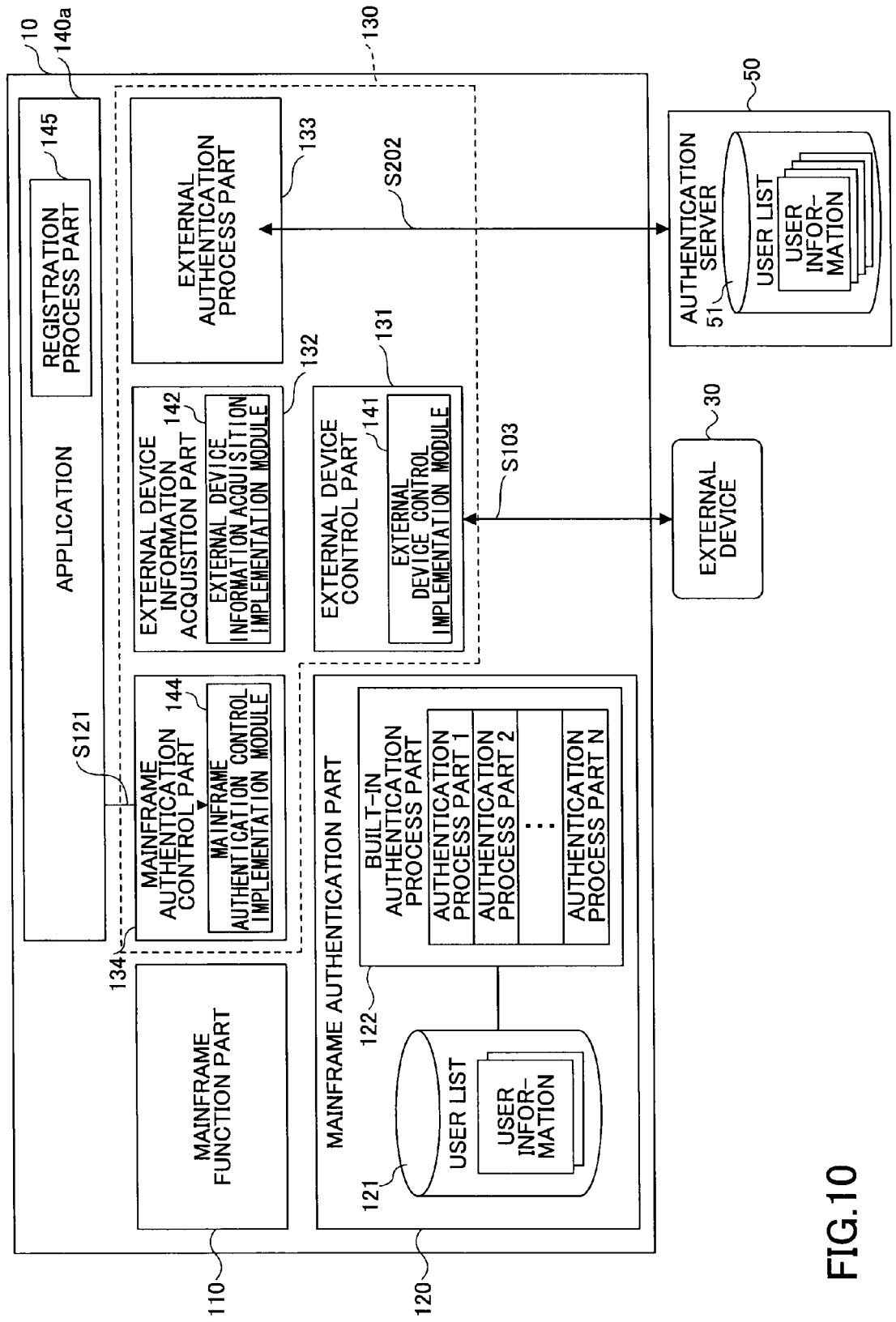
FIG. 10 is a diagram illustrating an exemplary case in which a mainframe authentication control part of the authentication framework performs an authentication process in place of an authentication process part.

FIG. 10 is a diagram illustrating an example in which the mainframe authentication control part 134 performs an authentication process in place of the built-in authentication process part 122. As is described above, an arbitrary implementation module for controlling mainframe authentication may be registered in the mainframe authentication control part 134 as the mainframe authentication control implementation module 144. Specifically, upon receiving an authentication request from the application 140a (S121), the mainframe authentication control part 134 may execute an authentication process by referring to an arbitrary implementation module registered as the mainframe authentication control implementation module 144. Accordingly, the mainframe authentication control implementation module 144 may be configured to have the authentication process executed and completed within the mainframe authentication control implementation module 144 so that an authentication process may not have to be performed by the built-in authentication process part 122 and pre-registration operations may not have to be performed on the user list 121. It is noted that in this case, a user list to be used by the mainframe authentication control implementation module 144 has to be provided. In one example, a duplicate copy of a user list 51 of the authentication server 50 may be used as the user list for the mainframe authentication control implementation module 144 so that the operation load may be reduced. In another example, the mainframe authentication control implementation module 144 may be configured to refer to the user list 51 of the authentication server 50 in the authentication process.

It is noted that by using the authentication framework of the present embodiment, a specific device to be used as the external device 30 from which user information is acquired may be arbitrarily selected. In other words, the external device control implementation module 141 and the external device information acquisition implementation module 142 may be implemented in accordance with the specific device being used as the external device 30. In one preferred embodiment, arrangements may be made to acquire information on the external device 30 being used (e.g., information for identifying the type of the external device 30; referred to as 'external device information' hereinafter) so that the mainframe authentication control implementation module 144 to be used (or to be registered) may be dynamically changed according to the external device information. In another embodiment, when user information is acquired via the external device 30, the mainframe authentication control implementation module 144 to be used (or to be registered) may be dynamically changed according to certain rules depending on the user information. For example, the schema (format) of the acquired user information may be analyzed and an implementation module suitably adapted for the corresponding schema may be used as the mainframe authentication control implementation module 144. In another example, if the name of a group to which the user belongs is included in the user information, the mainframe authentication control implementation module 144 to be used may be selected according to the group name. It is noted that in the case of applying the above-described examples, the correlation between differing schemas and mainframe authentication control implementation modules 144 or the correlation between group names and mainframe authentication control implementation modules 144 may be stored beforehand in the storage medium 103, for example.

Figure 11:
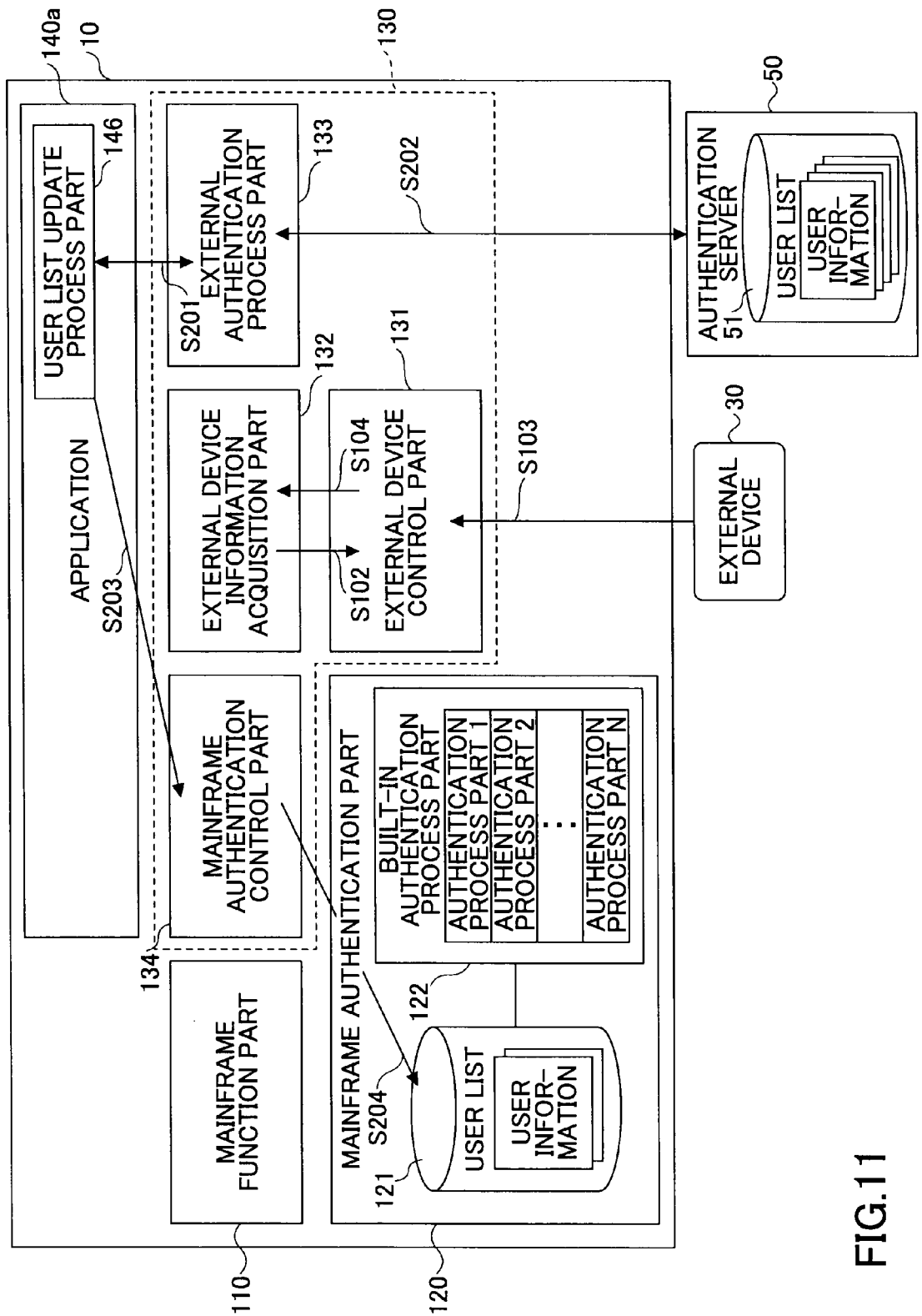
FIG. 11 is a diagram illustrating an exemplary process of automatically generating a user list of the authentication process part based on a user list of an external authentication service.

FIG. 11 is a diagram illustrating an exemplary process of automatically generating the user list 121 of the mainframe authentication part 120 based on a user list of an external authentication service. In the illustrated example of FIG. 11, the application 140a includes a user list update process part.

The user list update process part 146 acquires the user list 51 of the authentication server 50 via the external authentication process part 133 as a background process (S201 and S202), and continually (periodically) performs a process of registering the acquired user list 51 in the user list 121 via the mainframe authentication control part 144 (S203 and S204). In one preferred embodiment, the registration operations may involve registering updated portions (differing portions) of the acquired user list 51 in the user list 121.

In the example of FIG. 11, the information in the user list 121 of the mainframe authentication part 120 may be automatically updated (synchronized) to reflect the information in the user list 51 of the authentication server 50. Accordingly, pre-registration operations of the user list 121 may become unnecessary. Also, because the user list 121 within the image forming apparatus 10 may be updated when the user list 51 of the external authentication server 50 is edited, maintenance operations may be reduced.

Figure 12:
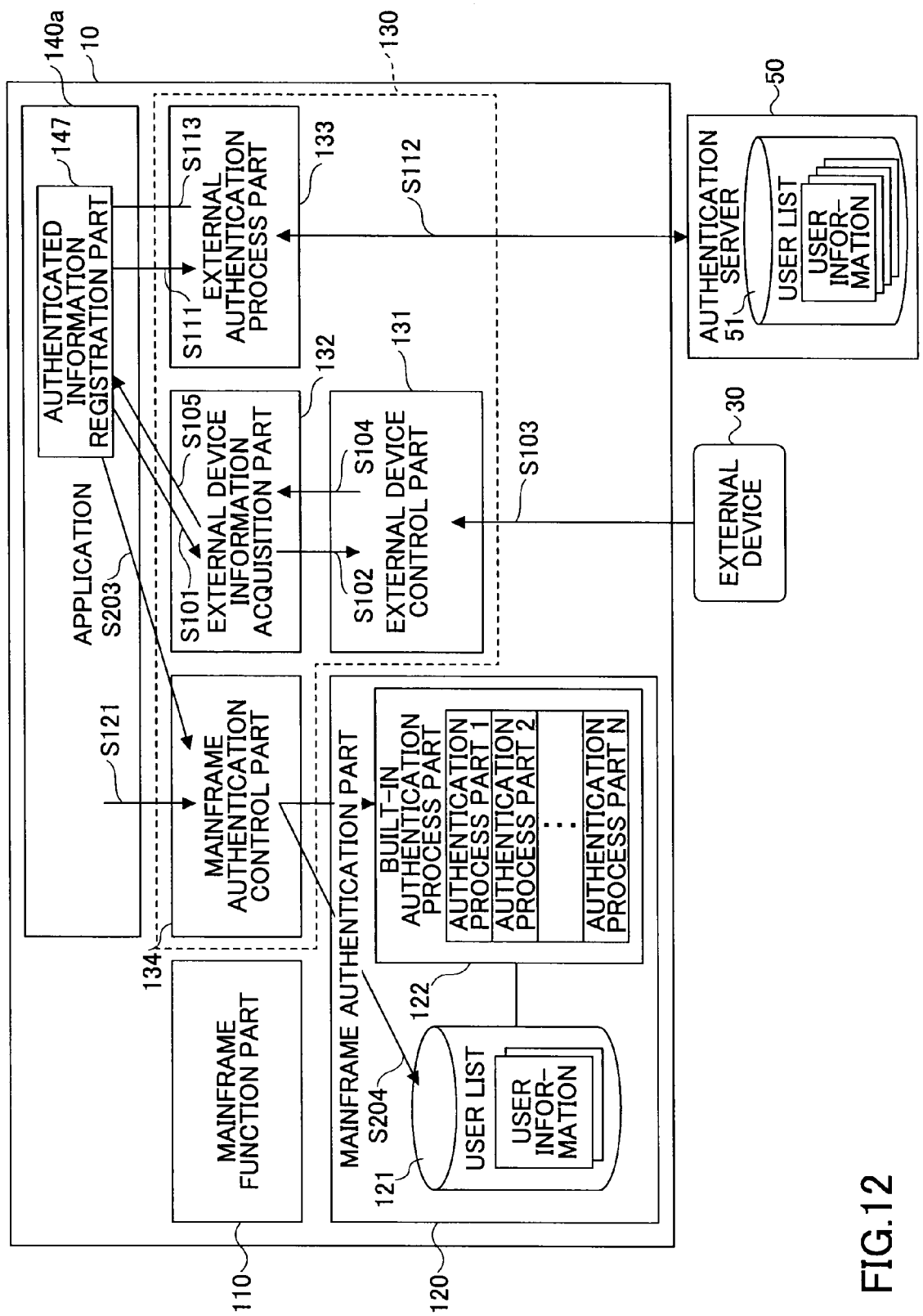
FIG. 12 is a diagram illustrating an exemplary process of dynamically registering user information acquired through an external authentication service in the mainframe authentication process part.

FIG. 12 is a diagram illustrating an exemplary process of dynamically registering user information that has been acquired through an external authentication service in the mainframe authentication part 120. It is noted that in FIG. 12, process steps that are identical to those described in relation to FIGS. 9 and 11 are given the same reference numerals. In the illustrated example of FIG. 12, the application 140a includes an authenticated information registration part 147.

Upon acquiring user information from the external device 30 (S101-S105), the authenticated information registration part 147 has the authentication server 50 authenticate the acquired user information (S111-S113). If the authentication is successful (i.e., if the acquired user information is authenticated), the authenticated information registration part 147 registers the user information acquired from the external device 30 in the user list 121 of the mainframe authentication part 120 (S203 and S204).

Then, the application 140a may send an authentication request to the mainframe authentication control part 134 to authenticate the user information acquired from the external device 30 (S121), and the mainframe authentication control part 134 may control the built-in authentication process part 122 to execute a corresponding authentication process (S122).

It is noted that the illustrated example of FIG. 12 may be applied to an authentication mechanism that allows user information to pass through mainframe authentication within the image forming apparatus 10 if authentication at the authentication server 50 is successful (i.e., authentication mechanism in which actual user authentication is ensured by an external authentication service).

In this case, when a user logs out (when the authenticated status of the user is terminated), the mainframe authentication control part 134 may delete the corresponding user information of this user from the user list 121. In this way, the memory consumption amount of the storage medium 103 may be reduced, for example.

As can be appreciated from the above descriptions, in the image forming apparatus 10 according to the above-described embodiments of the present invention, an external device from which user information is to be acquired and/or an external server for performing external authentication may be flexibly selected according to various circumstances. In this way, an authentication system that is already implemented in a user environment may be used to restrict usage of the image forming apparatus 10 according to an embodiment of the present invention, for example.

Also, it is noted that in the image forming apparatus 10 according to the above-described embodiments of the present invention, the user list 121 may embody a user information managing part that manages registered user information, the built-in authentication process part 121 may embody an authentication part that performs user authentication using the registered user information managed by the user information managing part, the external authentication process part 133 and the authenticated information registration part 147 may embody an external authentication part that controls an external computer to perform authentication on user information input via an input interface and acquires authenticated user information from the computer when the input user information is successfully authenticated by the computer, and the mainframe authentication control part 134 and the authenticated information registration part 147 may embody a registration part that registers the authenticated user information acquired by the external authentication part in the user information managing part as the registered user information.

Further, it is noted that although the present invention is described above with respect to certain preferred embodiments, the present invention is not limited to these specifically disclosed embodiments, and variations and modifications may be made without departing from the scope of the present invention.

The present application is based on Japanese Patent Application No. 2007-235768 filed on Sep. 11, 2007, the entire contents of which are hereby incorporated herein by reference.

What is claimed is:

1. An image forming apparatus, comprising:
an image output unit configured to output image data;
a first receiving unit configured to receive recording medium identification information read from a single recording medium by a reading device;
a second receiving unit configured to receive input information input by a user;
a first authentication process control unit configured to perform a first authentication process, in which the user is requested to input only the input information as authentication information, using the input information;
a second authentication process control unit configured to perform a second authentication process, in which the user is requested to cause the reading device to read, as the authentication information, only the recording medium identification information from the single recording medium, using the recording medium identification information;
a third authentication process control unit configured to perform a third authentication process, in which the user is requested to input only, as a first part of the authentication information, the input information, and cause the reading device to read, as a second part of the authentication information, the recording medium identification information from the single recording medium, using the recording medium identification information and the input information;
a first registration unit configured to register, in a memory of the image forming apparatus, first registration information for selecting and controlling one of the first, second, and third authentication processes; and
an authentication processing unit configured to cause one of the first, second, and third authentication processes to be performed to carry out authentication on the authentication information, based on the registered first registration information.

2. The image forming apparatus as claimed in claim 1, wherein
the first authentication process control unit is configured to perform the first authentication process using user identification information and a password, the user identification information and the password being input as the input information by the user, and
the third authentication process control unit is configured to perform the third authentication process using the recording medium identification information and the password, the password being input as the input information by the user.

3. The image forming apparatus as claimed in claim 2, wherein
the second authentication process control unit is configured to perform the second authentication process using user information specified based on the recording medium identification information; and
the third authentication process control unit is configured to perform the third authentication process using user information specified based on the recording medium identification information and the password.

4. The image forming apparatus as claimed in claim 1, further comprising:
a second registration unit configured to register second registration information for selecting the authentication process performed by using the external authentication apparatus or not using the external authentication apparatus, wherein
the authentication processing unit is configured to perform the authentication process based on the first and second registration information.

5. The image forming apparatus as claimed in claim 1, wherein the image output unit is configured to print the image data.

6. An authentication control method implemented by a processor programmed to control an image forming apparatus that includes an image output unit configured to output image data and an authentication processing unit that performs a user authentication process, the method comprising:
registering, in a memory of the image forming apparatus, first registration information for selecting one of first, second, and third authentication processes; and
performing one of the first, second, and third authentication processes to carry out authentication on authentication information based on the registered first registration information,
wherein the first authentication process is a process in which the user is requested to input only the input information as the authentication information, and which uses the input information input by the user, the second authentication process is a process in which the user is requested to cause a reading device to read, as the authentication information, only recording medium identification information from a single recording medium, and which uses the recording medium identification information read from the single recording medium, and the third authentication process is a process in which the user is requested to input only, as a first part of the authentication information, the input information, and cause the reading device to read, as a second part of the authentication information, the recording medium identification information from the single recording medium, and which uses the input information and the recording medium identification.

7. A non-transitory computer-readable medium storing an authentication control program which, when executed by a processor of an image forming apparatus that includes an image output unit configured to output image data, causes the image forming apparatus to perform an authentication control method, the method comprising:
registering, in a memory of the image forming apparatus, first registration information for selecting one of first, second, and third authentication processes; and
performing one of the first, second, and third authentication processes to carry out authentication on authentication information based on the registered first registration information,
wherein the first authentication process is a process in which the user is requested to input only the input information as the authentication information, and which uses the input information input by the user, the second authentication process is a process in which the user is requested to cause a reading device to read, as the authentication information, only recording medium identification information from a single recording medium, and which uses the recording medium identification information read from the single recording medium, and the third authentication process is a process in which the user is requested to input only, as a first part of the authentication information, the input information, and cause the reading device to read, as a second part of the authentication information, the recording medium identification information from the single recording medium, and which uses the input information and the recording medium identification.

* * * * *